(12) United States Patent
Childress et al.

(10) Patent No.: US 10,848,498 B2
(45) Date of Patent: Nov. 24, 2020

(54) SYSTEMS AND METHODS FOR DYNAMIC GRANULAR ACCESS PERMISSIONS

(71) Applicant: Capital One Services, LLC, McLean, VA (US)

(72) Inventors: Brian Childress, Richmond, VA (US); Sean Stokely, Richmond, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/539,082

(22) Filed: Aug. 13, 2019

(65) Prior Publication Data
US 2020/0053091 A1 Feb. 13, 2020

Related U.S. Application Data

(60) Provisional application No. 62/718,229, filed on Aug. 13, 2018.

(51) Int. Cl.
*H04L 29/06* (2006.01)
*G06F 9/451* (2018.01)

(52) U.S. Cl.
CPC ............ *H04L 63/102* (2013.01); *G06F 9/451* (2018.02); *H04L 63/08* (2013.01); *H04L 63/108* (2013.01)

(58) Field of Classification Search
CPC ..... H04L 63/102; H04L 63/108; H04L 63/08; G06F 9/451
See application file for complete search history.

(56) References Cited

U.S. PATENT DOCUMENTS

| 8,955,148 B1 | 2/2015 | Biegala et al. |
| 9,147,066 B1 | 9/2015 | Tian et al. |

(Continued)

FOREIGN PATENT DOCUMENTS

| EP | 2450818 A1 | 5/2012 |
| WO | 2013035409 A1 | 3/2013 |

OTHER PUBLICATIONS

Coimbatore Chandersekaram et al., "Claims-Based ENterprise-Wide Access Control," Jul. 4-6, 2012, pp. 1-6 (Year: 2012).*

(Continued)

*Primary Examiner* — Luu T Pham
*Assistant Examiner* — Canh Le
(74) *Attorney, Agent, or Firm* — Hunton Andrews Kurth LLP

(57) ABSTRACT

An application for dynamic, granular access permissions can include a database interface, a user interface, a login process, an administrator, an event handler and an authorization process. The database interface can be an interface to an access control permissions database that stores roles, actions, or policies for users of the application. The login process can authenticate a user and determine a default set of access control permissions for that user when they are using the user interface. The administrator can provide access control permissions for a user by using the database interface. The event handler can dynamically modify access to functionality in the user interface based on an event. The authorization process can determine whether a request from the user interface is authorized before process the request. The authorization process can use access control permissions from the administrator and either a scope limited or a temporally limited access permission.

18 Claims, 14 Drawing Sheets

(56) References Cited

U.S. PATENT DOCUMENTS

| | | | |
|---|---|---|---|
| 2008/0127060 A1* | 5/2008 | Reamey | G06F 9/451 717/106 |
| 2008/0189793 A1 | 8/2008 | Kirkup et al. | |
| 2010/0185875 A1 | 7/2010 | Mayer et al. | |
| 2010/0299738 A1* | 11/2010 | Wahl | G06F 21/305 726/9 |
| 2011/0131633 A1 | 6/2011 | MacAskill et al. | |
| 2012/0110055 A1* | 5/2012 | Van Biljon | G06Q 30/04 709/201 |
| 2012/0117142 A1 | 5/2012 | Lu | |
| 2013/0067599 A1 | 3/2013 | Raje et al. | |
| 2013/0332506 A1* | 12/2013 | Ewe | G06F 9/452 709/203 |
| 2014/0223512 A1 | 8/2014 | Hagiwara et al. | |
| 2014/0258717 A1 | 9/2014 | Baek et al. | |
| 2015/0106736 A1* | 4/2015 | Torman | G06F 21/629 715/745 |
| 2015/0256526 A1 | 9/2015 | Biegala et al. | |
| 2015/0261971 A1 | 9/2015 | McFerrin et al. | |
| 2015/0356283 A1 | 12/2015 | Kress | |
| 2015/0356302 A1* | 12/2015 | Simpson | G06F 21/577 726/25 |
| 2016/0104067 A1* | 4/2016 | Xu | H04L 67/306 706/46 |
| 2016/0104352 A1* | 4/2016 | Kehoe | H04L 67/125 463/25 |
| 2016/0127339 A1 | 5/2016 | Childs et al. | |
| 2016/0173454 A1 | 6/2016 | Statchuk | |
| 2016/0191654 A1 | 6/2016 | Healey et al. | |
| 2016/0212134 A1 | 7/2016 | Ryder | |
| 2016/0315917 A1 | 10/2016 | Smith et al. | |
| 2016/0342440 A1 | 11/2016 | Ashok et al. | |
| 2016/0357981 A1* | 12/2016 | Tzeng | G06F 21/6218 |
| 2017/0041322 A1 | 2/2017 | Kurian et al. | |
| 2017/0099292 A1 | 4/2017 | Kelley et al. | |
| 2017/0237729 A1 | 8/2017 | Uppalapati | |
| 2017/0328725 A1* | 11/2017 | Schlesinger | G01C 21/3484 |
| 2017/0337391 A1* | 11/2017 | Chang | H04L 69/24 |
| 2018/0060567 A1 | 3/2018 | Ilaiwi et al. | |

OTHER PUBLICATIONS

Mohammad Al-Kahtani et al., "Induced Role Hierarchies with Attribute-Based RBAC," Jun. 2-3, 2003, pp. 142-148. (Year: 2003).*

* cited by examiner

SYSTEMS AND METHODS FOR DYNAMIC GRANULAR ACCESS PERMISSIONS

CLAIM OF PRIORITY

This application relates to and claims priority from U.S. Provisional Patent Application No. 62/718,229, filed Aug. 13, 2018, the entire disclosure of which is incorporated herein by reference.

FIELD OF THE INVENTION

The present disclosure generally relates to securing software applications with superior user authorization and, in particular, to systems and methods for dynamic and granular user access permissions.

BACKGROUND

As software development of applications has changed, application security has not kept pace and lags behind. Gone are the days where an information technology ("IT") shop would take months to refine requirements, build and test prototypes, and deliver a finished product to an end-user department. Instead, there are new working methods, called continuous deployment and integration that refine an app daily, and in some cases, hourly. This means that application security and access control have to work in this ever-changing world. Developers write applications using platforms or frameworks that have shifted logic and control to the client-side. As developers have focused on the user experience, application security has not changed from old models.

Traditional user access permissions determine what files and information a given user can view or edit, and what abilities the user has to create or delete files and/or information. Accordingly, user access permissions are essential features of computer systems and play a key role in application development and management, data security, and user privacy, among other areas. Access credentials are commonly implemented within the "CRUD" paradigm, i.e., permissions for a user to create, read, update, and delete information.

User access permissions are often implemented based on a high-level classification of a user, such as the user's job title or role. A simple solution to granting user access (e.g., high-level access permissions) can be an inaccurate fit for a user's needs, and often places users into groups with broad permissions well beyond what an individual user requires. This can hinder application development, reduce data security, and undermine privacy controls. Conversely, overly restrictive access permissions can reduce productivity and make communication and information sharing more difficult.

In addition, a user's access needs can change over time. For example, a user can take a different position within an organization, or within a team, that requires a change in access permission. Similarly, the needs of a project can change over time and render access permissions set at a previous time out of date.

For example, it is too burdensome to create a controller and interfaces for managing roles in the open-source server-side web application framework ASP.NET for web development to produce dynamic web pages. It is difficult unless there is a way to dynamically detect access for a controller at runtime. There is no way to capture the moment when the user requests an action from a controller or even the instance of the controller to check permissions at the point from a database. It is possible to use the authorize attribute on class (e.g., controller) level, even a method level (e.g., action), so the user can request the controller, but not all actions. Additionally, it is not efficient to dedicate the resources and time to create CRUD permissions for roles when it is necessary to configure the application in code in the first place to set the authorize attribute to even set the role that should have access. In other words, it is not efficient to manage ever changing roles based on hard-coded permissions.

Thus, it may be beneficial to provide exemplary systems and methods for dynamic granular access permissions which can overcome at least some of the deficiencies described herein above.

SUMMARY

The disclosed subject matter is directed to systems and methods for dynamic granular user access permissions that satisfy these needs.

According to an example embodiment, a system can include a server, an access permission database, and a memory. The server can provide an application to users. The access permission database can be accessible by the server. The access permission database can store permanent access permissions for the users. The memory can store temporary access permissions for a first user while the application is executing. The memory can be accessible by the server. The application can be configured to retrieve the permanent access permissions for the first user from the access permission database. After an authentication of the first user, the application can determine a set of default access permissions for the first user based on the permanent access permissions. The application can store the default access permissions as the temporary access permissions in memory. The application can dynamically modify the temporary access permission for the first user by applying a granular access permission to the first user. The granular access permissions can be a scope limited access permission or a temporally limited access permission. The scope limited access permission can limit actions associated with an object, a component, an application, a program, a system, or a project. The temporally limited access permission can limit actions for the first user before, during, or after a time period. The permanent access permissions can include security groups of users. The users in each security group can have the same set of the access permissions. The security group can have sub-groups that inherit the access permissions of the security group. The application can be further configured to dynamically modify at least one of the temporary access permissions of a user of a respective security group. The application can be further configured to remove the user from the security group when the dynamic modification of the temporary access permissions is inconsistent with the security group. The application can be further configured to determine the temporary access permission for an action requested by the first user before executing the action. The application can be further configured to provide a user interface including only actions that are permitted for the first user. The actions can be modified on the user interface due to a temporal limitation.

According to an example embodiment, a method can include storing access control permissions in a database. A user interface that authenticates users can be provided for the application. Access to functionality in the user interface can be dynamically modified based on an event. Whether a request from the user interface is authorized can be determined conditionally based on an access control permission from the database and a scope limited access permission. Whether a request from the user interface is authorized can be determined conditionally based on an access control permission from the database and a temporally limited access permission. A default set of access control permissions can be determined for the user interface. The user interface can be limited to the default access control permissions. When access to functionality is dynamically modified, the access control permissions in the database can be modified. Requests from the user interface can include routing requests. The application can be a software development platform and the scope or temporal limitations can be related to software development. The user interface can include a user management process that provides tools for managing users, such as adding, updating and deleting users. The user management process can change access control permissions in the database.

According to an example embodiment, an application can include a database interface, a user interface, a login process, an administrator, an event handler and an authorization process. The database interface can be an interface to an access control permissions database that stores roles, actions, or policies for users of the application. The login process can authenticate a user and determine a default set of access control permissions for that user when they are using the user interface. The administrator can provide access control permissions for a user by using the database interface. The event handler can dynamically modify access to functionality in the user interface based on an event. The authorization process can determine whether a request from the user interface is authorized before process the request. The authorization process can use access control permissions from the administrator and either a scope limited access permission or a temporally limited access These and other features, aspects and advantages of the disclosed subject matter are explained in greater detail with reference to specific example embodiments that are illustrated in the following description, appended claims, and accompanying drawings, in which like elements are indicated with like reference designators.

DETAILED DESCRIPTION OF EXAMPLE EMBODIMENTS

The following description of embodiments provides non-limiting representative examples referencing numerals to particularly describe features and teachings of different aspects of the invention. The embodiments described are recognized as capable of implementation separately, or in combination, with other embodiments from the description of the embodiments. A person of ordinary skill in the art reviewing the description of embodiments can learn and understand the different described aspects of the invention. The description of embodiments can facilitate understanding of the invention to such an extent that other implementations, not specifically covered but within the knowledge of a person of skill in the art having read the description of embodiments, would be understood to be consistent with an application of the invention.

The present disclosure can include systems, methods, and computer-accessible mediums for dynamic, granular user access permissions.

Figure 1:
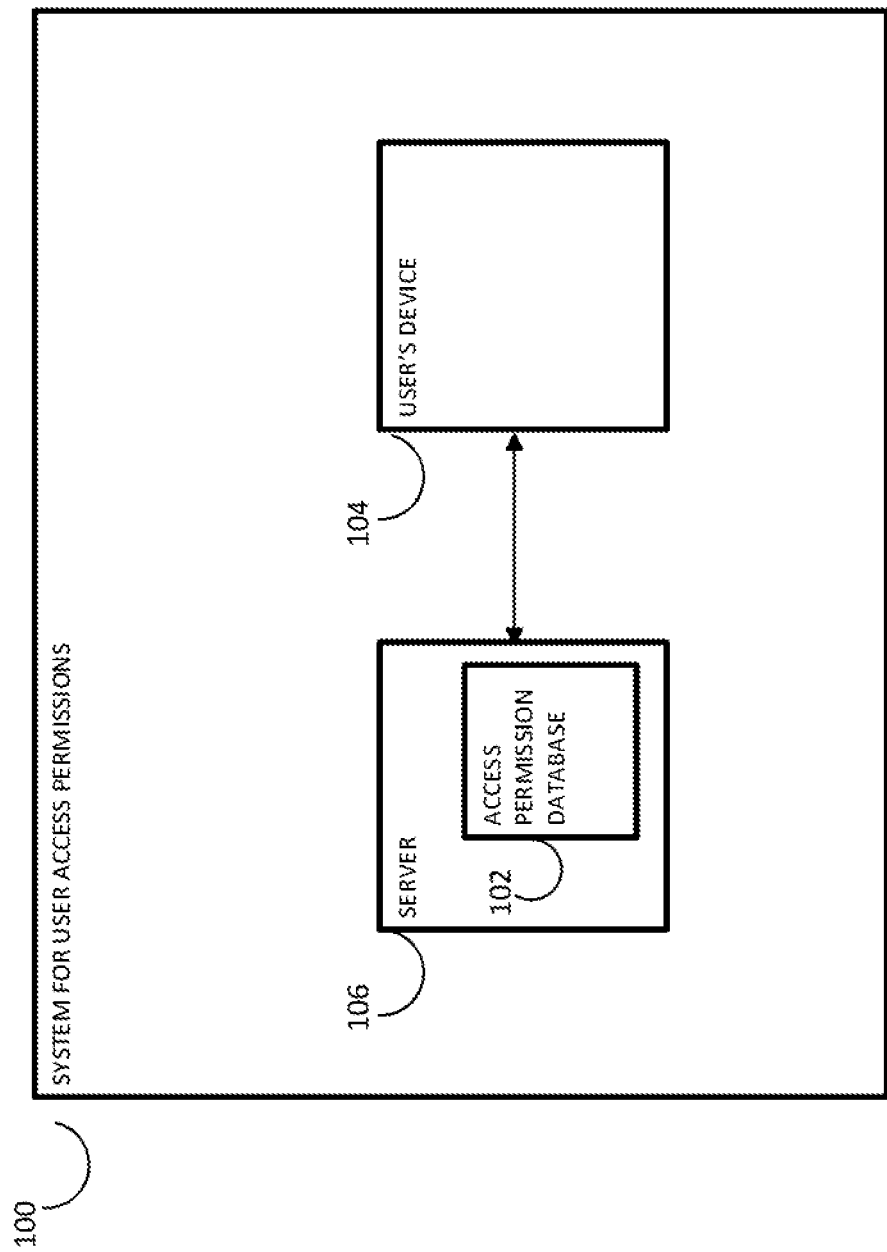
FIG. 1 is a diagram of a system for user access permissions, according to an example embodiment.

FIG. 1 is a schematic diagram of a system 100 for dynamic, granular user access permissions, according to an example embodiment. Access permissions for one or more users can be maintained in an access permission database 102. The access permission database 102 can be a relational or non-relational database, or a combination of more than one database. The access permissions database 102 can be stored remotely, such as in another server 106, on a cloud-based platform, or in any storage device that is in data communication with the user's device 104. The server 106 storing the access permission database 102 can be a dedicated server computer, such as bladed servers, or can be personal computers, laptop computers, notebook computers, palm top computers, network computers, mobile devices, or any processor-controlled device capable of supporting the access permission database and communicating with the user's device. In an embodiment, access permissions can be maintained in JavaScript Object Notation ("JSON") form and communicated as a HyperText Transfer Protocol ("HTTP") response, data stream, JSON web token, or any suitable method to transport data from one system to another. Multiple servers or multiple computer systems can be used as necessary or desired to support the user. Back-up or redundant servers may also be used to prevent network downtime in the event of a failure of a particular server.

The user's device 104 can be a desktop computer, a laptop computer, a tablet computer, a smartphone, a personal digital assistant, a thin client, a fat client, a combination thereof, or any other device supporting the work the user is required to perform. The user's device 104 can include a processor and a memory. It is understood that the processing circuitry can contain additional components, including processors, memories, error and parity/CRC checkers, data encoders, anti-collision algorithms, controllers, command decoders, security primitives and tamper proofing hardware, as necessary to perform the functions described herein.

The memory can be a read-only memory, write-once, read-multiple memory or read/write memory, e.g., RAM, ROM and EEPROM, and the user's device can include one or more of these memories. A read-only memory can be factory programmable as read-only or one-time programmable. One-time programmability provides the opportunity to write once then read many times. A write once/read-multiple memory can be programmed at a point in time after the memory chip has left the factory. Once the memory is programmed, it cannot be rewritten, but it can be read many times. A read/write memory can be programmed and re-programmed many times after leaving the factory. It can also be read many times.

The user's device 104 can further include wired or wireless data communication capability. These capabilities can support data communication with a wired or wireless communication network, a wireless personal area network, a wide area network, any other wired or wireless network for transmitting and receiving a data signal, or any combination thereof. This network can include, without limitation, telephone lines, fiber optics, IEEE Ethernet 902.3, a wide area network, a local area network, a wireless personal area network, a wide body area network or a global network, such as the Internet. The user's device 104 can also support a short-range wireless communication interface, such as near field communication, radio-frequency identification, and Bluetooth.

The user's device 104 can further include a display and input devices. The display can be any type of device for presenting visual information such as a computer monitor, a flat panel display, and a mobile device screen, including liquid crystal displays, light-emitting diode displays, plasma panels, and cathode ray tube displays. The input devices can include any device for entering information into the user's device 104 that is available and supported by the user's device 104 such as a touch-screen, keyboard, mouse, cursor-control device, microphone, digital camera, video recorder or camcorder. These devices can be used to enter information and interact with the software and other devices described herein.

Figure 2:
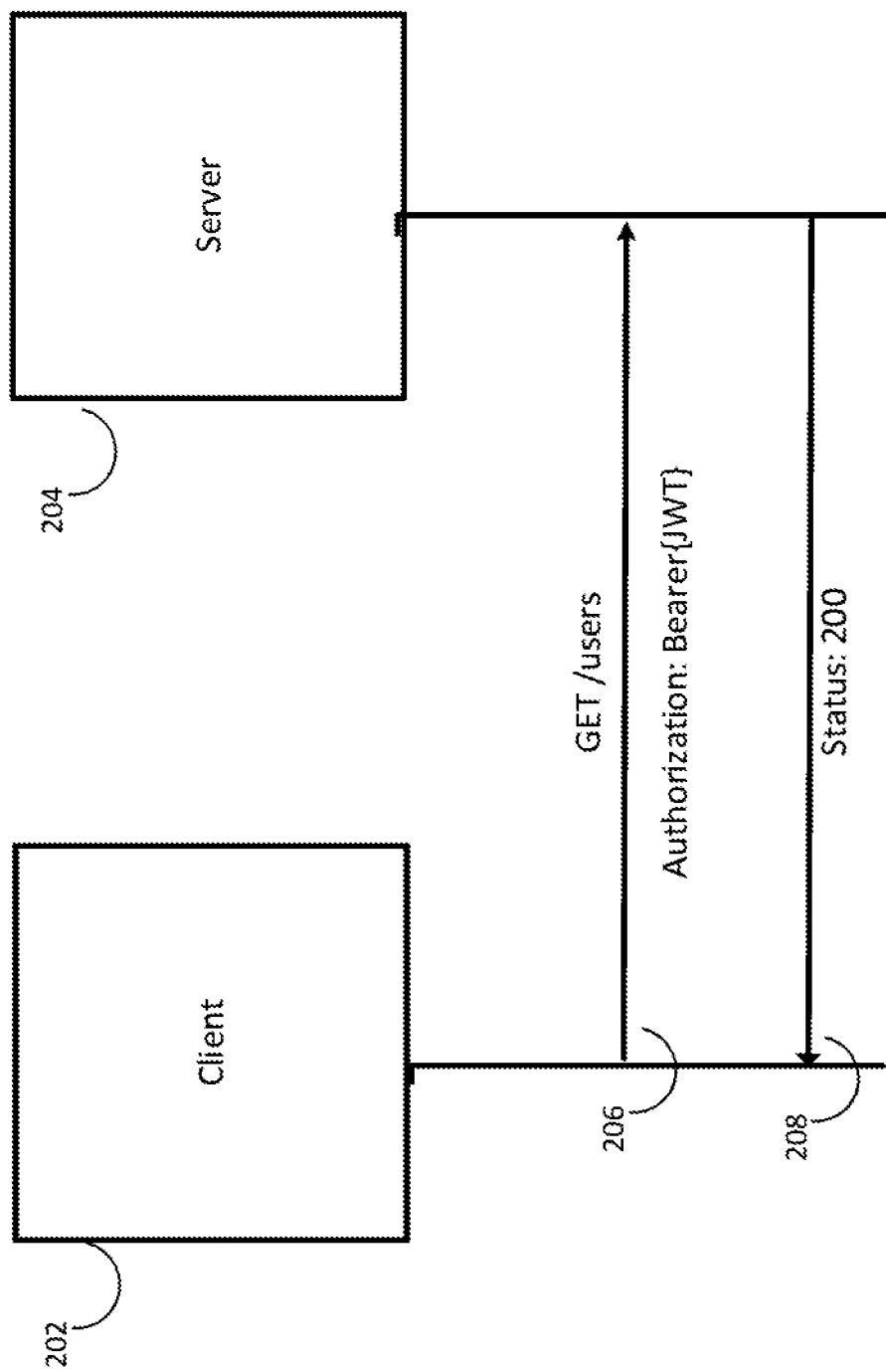
FIG. 2 is a client-server interaction diagram, according to an example embodiment.

FIG. 2 is a client-server interaction diagram, according to an example embodiment. An application can be designed using an architecture that splits the application into separate client and server components that communicate over a protocol such as HTTP. Each component can have a role in securing the application. A client 202 can communicate with a server 204 for authorization. The client 202 can send a message 206 to obtain users authorized using a shared authorization model such as JSON web tokens ("JWT") and, in response, the server 204 can send a message 208 with a status code (e.g., code 200) representing whether or not the users are authorized.

Authentication can be when the user supplies some information to a system that can be validated by the system. This can include multiple checks, along with a set of credentials like a username and password. Authentication can be used to try to determine "who are you?" Authorization is also interested in who the user is, but is used to determine what functions, actions, data, or other parts of an application the user has access. Authorization answers the question "what can you do?" It's not a requirement for a user that's been authenticated to also be authorized. An unauthenticated user can have some access to an application, although usually in a very limited capacity. In short, authentication is the process of verifying that "you are who you say you are," while authorization is the process of verifying that "you are permitted to do what you are trying to do."

When managing user authentication and authorization between client and server, or server-to-server, one option is token-based authorization. JSON web tokens (JWT) can provide a stateless communication mechanism for authorization. JWTs are JSONs that are cryptographically signed and able to be verified and validated by the recipient.

There can be many client and server interactions as a user navigates through an application having security aspects. The server 204 can validate and verify requests from the client 202, securing the application. For example, when the user opens the application on client 202, the user can first be authorized as an unauthenticated user. For example, a login screen or an application user interface can be displayed with a limited set of functionality. Next, the user is authenticated and the server 204 can successfully validate that the user is who they say they are. From there, the server can generate a JWT and send it back to the client application to store. Once the client application has some information about the user, such as information from the JWT, the client application can start to enable functionality for that user. If the user continues to be active in the application, the client 202 can continue making and processing requests to the server 204, passing the JWT to authorize each request.

A client-server system can use different approaches to authorization, such as role-based authorization (user-→role→permissions), claims-based authorization (user-→permission→action), or attribute-based authorization (policy>authorization→user). When role-based authorization is used, a user is assigned to a role or roles that determine what access they have within an application. This access can be to pages, components, functionality, or data within the application. A role-based approach to authorization usually aligns with an organization's hierarchy. An example group of roles can be manager, user and admin. These roles, when assigned to various users of an application, can grant some level of access to functionality and data. With role-based authorization, the client application can grant access to users based on their roles.

Another approach to authorization is claims-based authorization. Claims-based authorization can provide a more granular level of control over the authorized functionality for a user. In claims-based authorization, an application claims that a user can take actions such as editing products. Claims-based authorization can provide a level of authorization that is tied to the user and is not specific to a role within the application or organization. A claim can also be used to modify the user experience on the client application by enabling or disabling functionality for a user. As applications grow with more features and user types, roles-based and claims-based authorization approaches can become limiting. In such a scenario, an attribute-based approach can be beneficial.

An attribute-based approach to authorization is where a policy can be created to determine what authorization a user has within an application based on some condition. The policy can be anything. For example, the policy can be based on a business rule that application users are not allowed to edit product descriptions prior to 8:00 a.m. on the weekend. Another policy can be that all users in a specific security group can only view location information. Another policy can be that all users in the development environment have admin access. A set of policies can fit into a pattern for an application. Once that pattern is defined, logic can be used to make determinations about a user's access.

An attribute-based authorization approach may not be desirable inside a client application because of the sheer amount of logic that would need to exist. To simplify the management of attribute-based authorization on the client side, each component in the application can be given a unique name that can then be linked to any number of policies. That component name can be used to determine access levels for a user. To track these access levels, the Create, Read, Update, and Delete (CRUD) paradigm can be used. Each unique component can receive a CRUD object for each user, generated when they login. This can give the application a dynamic way to authorize users.

Figure 3:
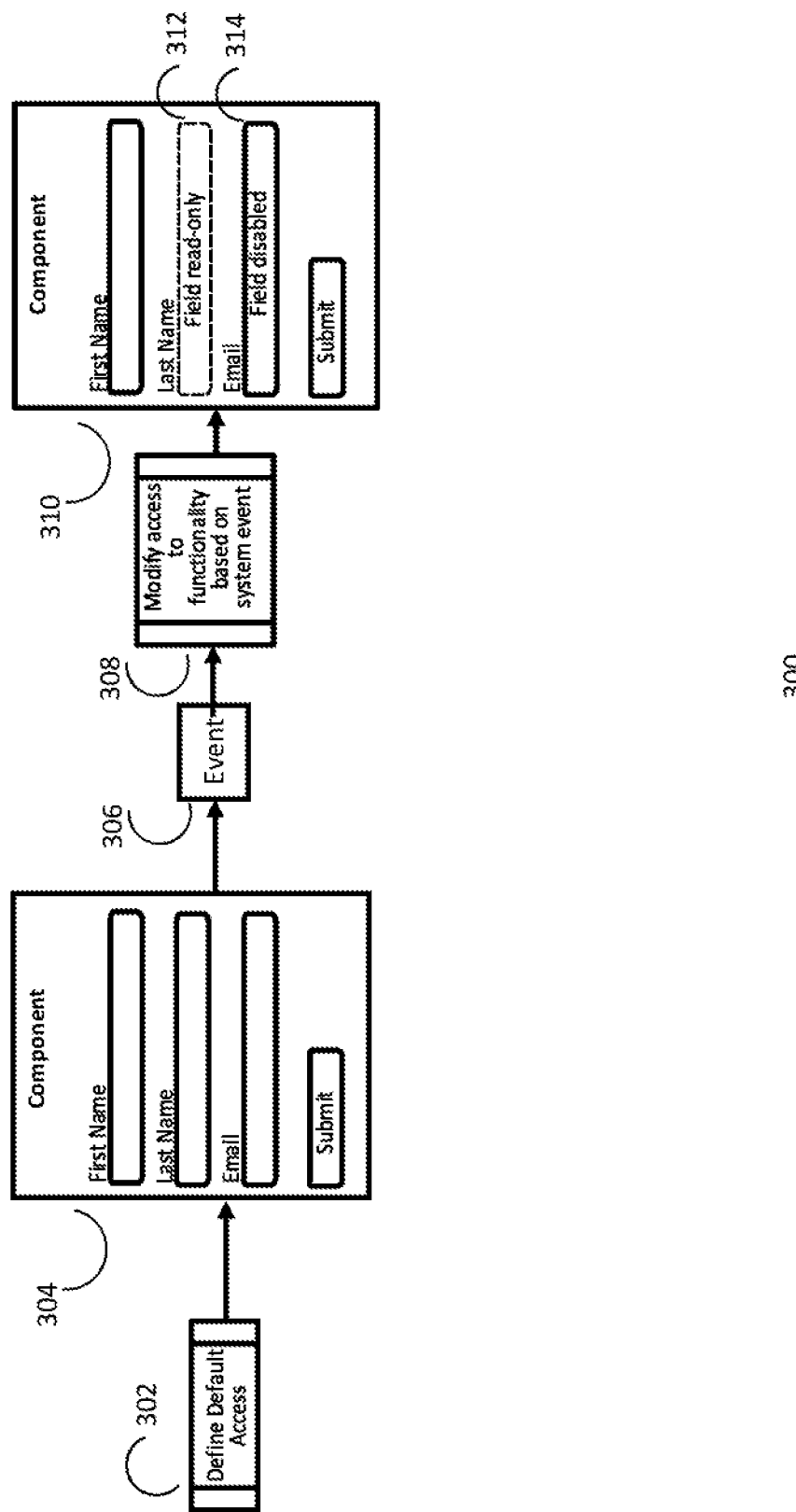
FIG. 3 is a diagram of a system for user access permissions, according to an example embodiment.

FIG. 3 illustrates a system 300 for user access permissions, according to an example embodiment. A first process 302 in an application can initially define default access permissions for a component 304. Then, an event 306 can trigger a second process 308 in the application to dynamically modify access permissions for some functionality of the modified component 310 which can, in turn, cause the user interface to display a first field 312 as read-only and disable a second field 314. Component 304 can be any part of a web application architecture. The web server can respond to requests for page resources or REST APIs from clients, such as browsers and mobile apps. Some examples of web application architectures, languages, or frameworks are Java, node.js, .NET, PHP, Python, and Angular.

Figure 4:
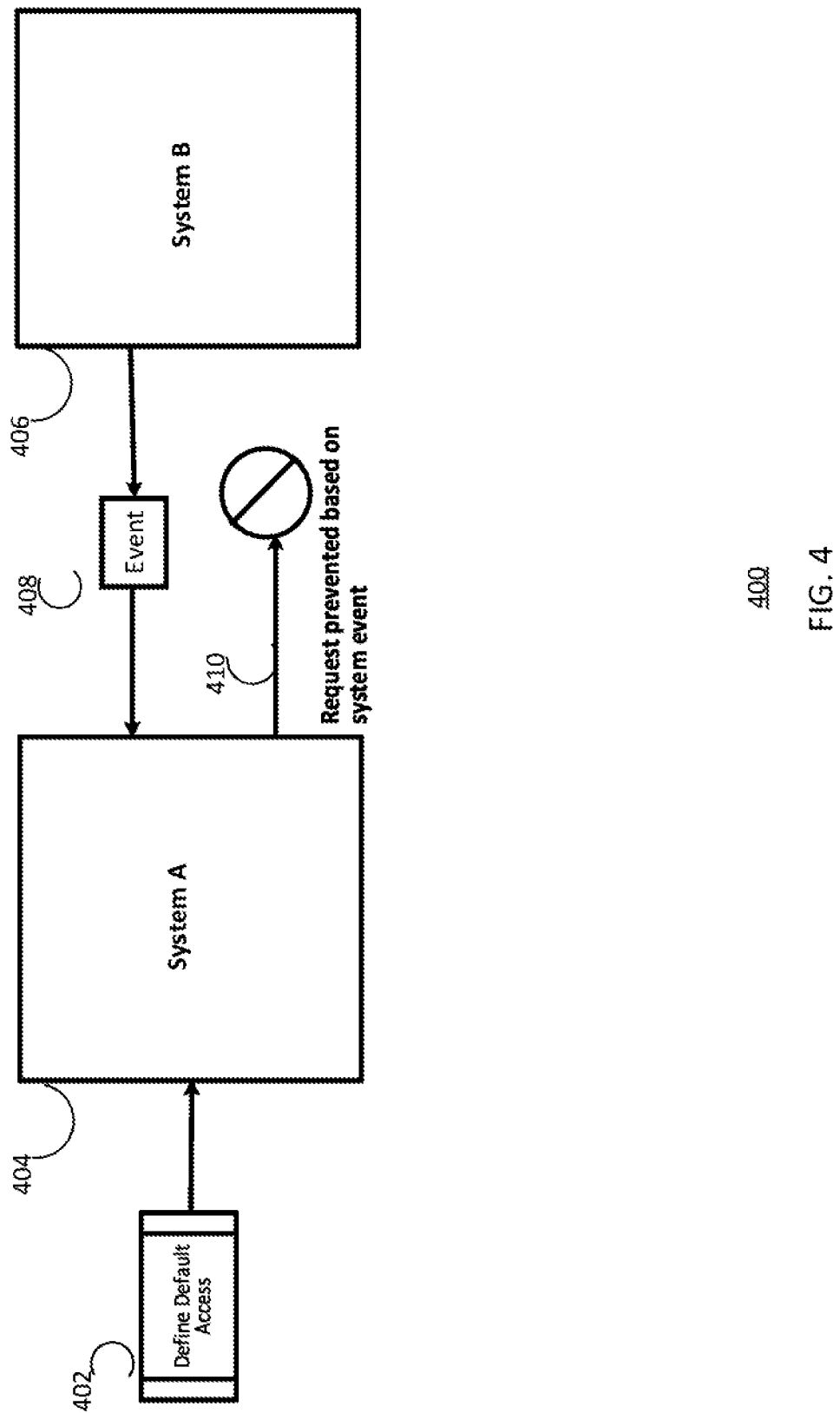
FIG. 4 is a diagram of a system for user access permissions, according to an example embodiment.

FIG. 4 illustrates a system 400 for user access permissions, according to an example embodiment. A process 402 in an application, which includes communication between system A 404 and system B 406, can define default access permissions that are dynamically altered by an event 408 communicated from system B 406 to system A 404. As a result of the event 408, a request from system A 404 to system B 406 can be prevented. For example, a user can attempt to go to a webpage that he/she does not have permission to access. System A 404 and system B 406 can be web browsers, clients, web application servers, applications such as single page applications, microservices, serverless architectures, user interfaces, middleware systems, databases, or other components. The event 408 can be a change in the user's access permissions, a scope limitation, a time duration limitation or some other condition, rule or logic. For example, a user can attempt to go to a web page that does not have an authorized route handler in the application. Web application route authorization can be done based on the client or framework being used.

Authorization Service

```
// API Response
const routeAuth = [..{
    "name": "users",
    "create": true,
    "read": true,
    "update": true,
    "delete": true
}];
// Authorization Service
let getRouteAuth = (route: string) => {
    // Find a matching route authorization for provided route
    const auth = routeAuth.find((obj) => {
        return obj.name === route; });
    if (auth){
        return auth.read;
    }
        return false;
}
```

For example, if the route requires the user to be authenticated, the client can ask the server for the route authorizations for that user for the current time period. The server can respond with an array of objects. Each object in the array can represent a different route within the client application. The route can be identified by its name and be unique to the application. Along with the route name can be Boolean values for each CRUD permission, giving an object like the following JSON object.

```
{
    "name": "users",
    "create": true,
    "read": true,
    "update": true,
    "delete": true
}
```

Figure 5:
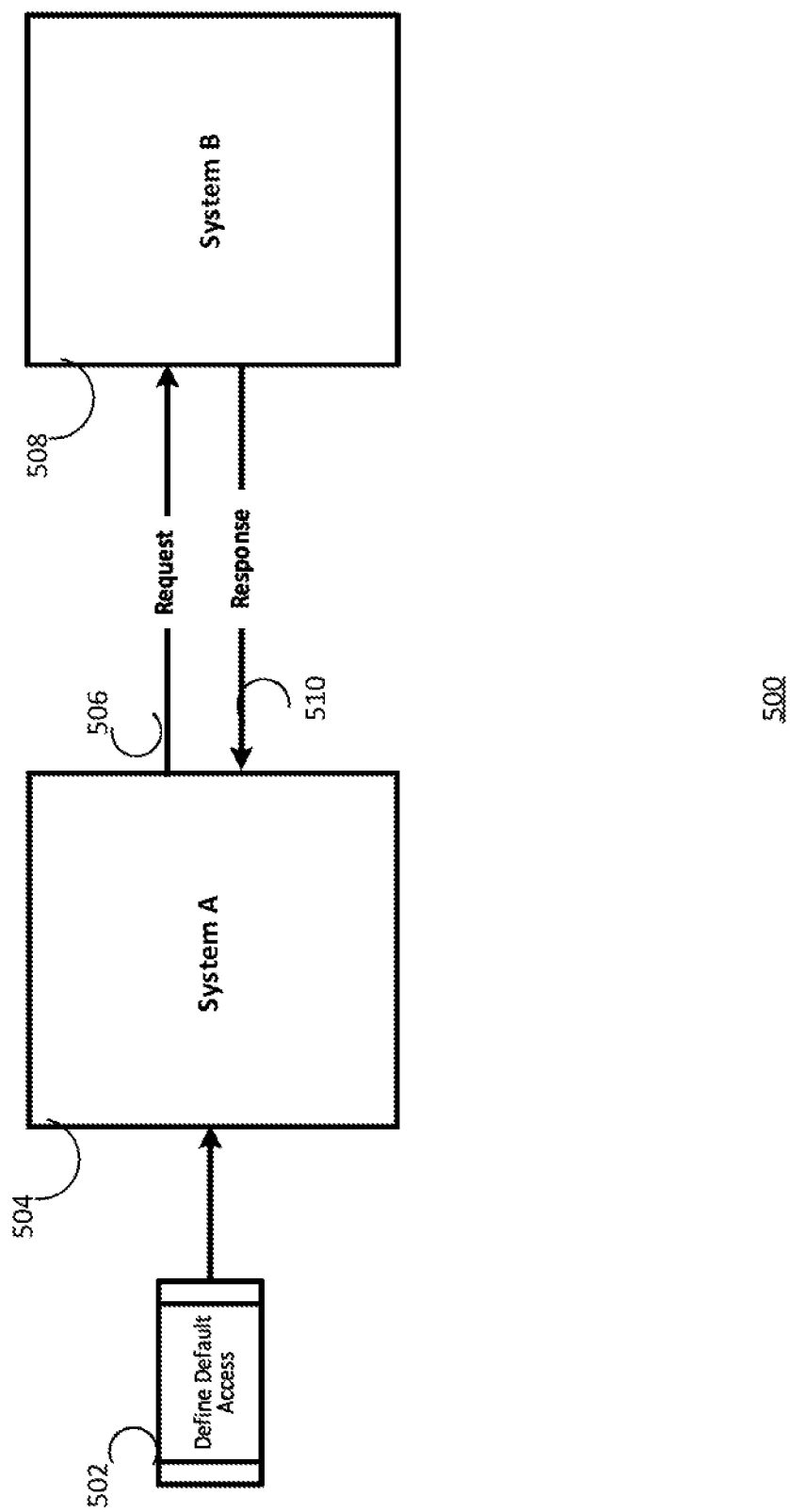
FIG. 5 is a diagram of a system for user access permissions, according to an example embodiment.

FIG. 5 illustrates a system 500 for user access permissions, according to an example embodiment. A process 502 can define default access control permissions for a system A 504. System A 504 can make a request 506 to a system B 508, which can send a response 510 that includes dynamic, granular access control permissions. System A 504 and system B 508 can be any kind of system components. For example, system A 504 can be a browser and system B 508 can be another application that provides business logic. A user can interact with an application on the browser, and then the browser can send a request to the application and receive a response from the application. CRUD can be applied to access control for a user role. A simple form can be used for inputting and updating a single user and authorization permissions might be configured for the current user as follows.

```
{
    "name": "userForm",
    "create": false,
    "read": true,
    "update": true,
    "delete": false
}
```

Similarly, if a user has a restricted set of permissions for the same user form component, the user experience can be dynamically modified to reflect the access for the current user as follows. This modification to the user experience does not require additional authorization logic on the user interface application.

```
{
    "name": "userForm",
    "create": false,
    "read": true,
    "update": false,
    "delete": false
}
```

Figure 6:
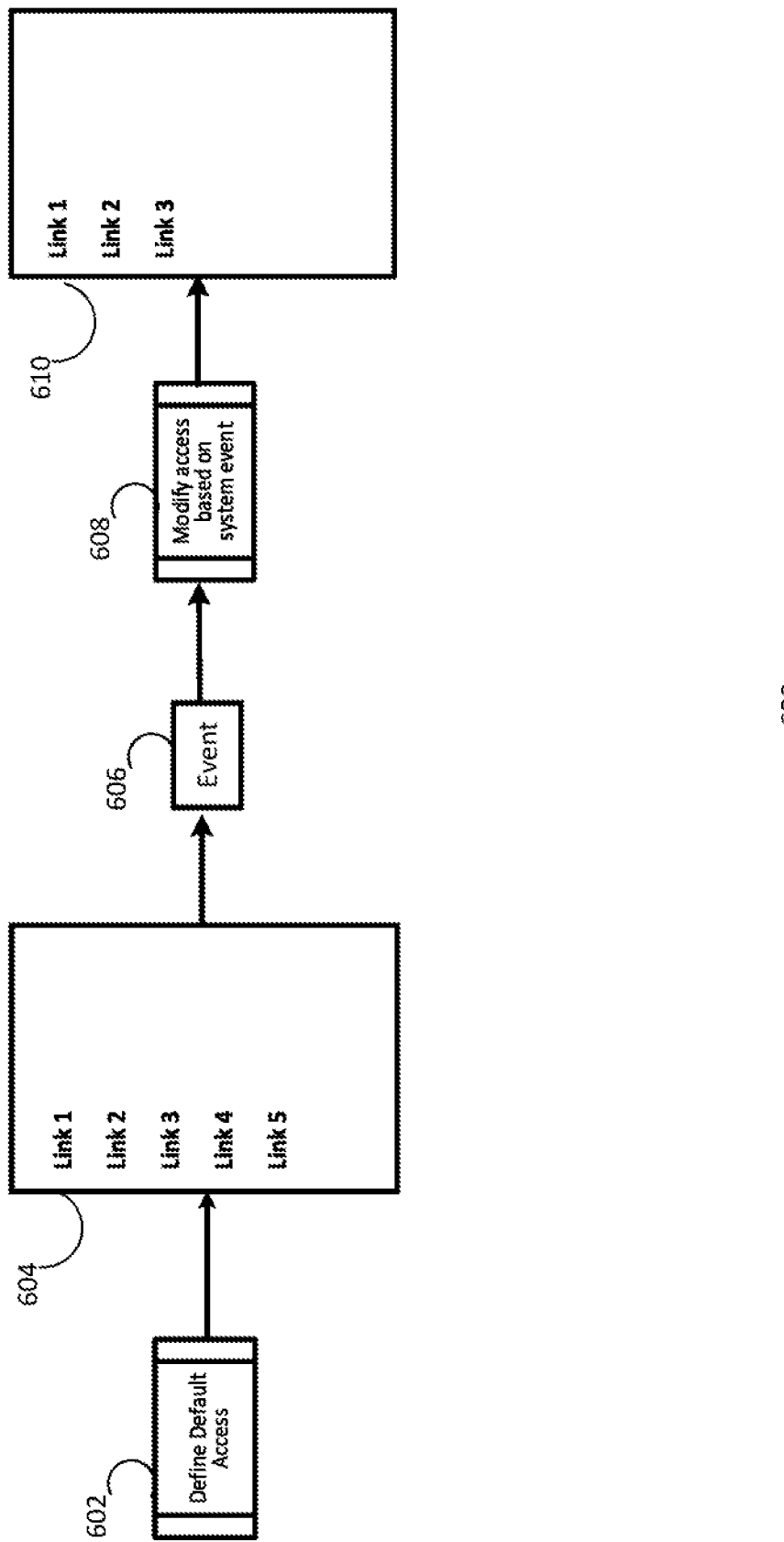
FIG. 6 is a diagram of a system for user access permissions, according to an example embodiment.

FIG. 6 illustrates a system 600 for user access permissions, according to an example embodiment. A process 602 defines default access permissions for a user that starts a session for an application with a client component having a display 604 showing certain functionality. The client component 604 handles an event 606 with a process 608 that modifies access permissions based on the event, resulting in different functionality available on the display 610. Based on the user's authorization level during a session, the client component can turn on or turn off functionality based on information provided by a server component. The client application does not need to include complicated business logic, roles, or policies, which can be handled by the server component. CRUD is much simpler to manage on the client-side and can provide the application fine-grained control over what a user is and is not allowed to do at any time. Moving the authorization to the routes and components level can allow the user interface to be as unaware as possible when it comes to authorizing a user. The user interface can use information it receives from a backend server to manage the setup of the application. For example, no business logic can be performed on the user interface related to authorization, only functional logic. For example, code can have conditions such as if this user has access to this route, then allow the user to access this route; if they do not have access, take every action to prevent the user from accessing this route, all based on information provided to the user interface when a user is authorized, and can be unique to the individual and/or their session.

The access permissions can be implemented using the "CRUD" paradigm, with a "create," "read," "update," and "delete" permission for each user. Each of these permissions can be assigned a Boolean value (i.e., "true" or "false"), and the value of these permissions can determine granular file-level, object-level, and functionality-level actions which can be taken by a user at any given point in time. For example, a user having the "delete" access permission set to a value of "true" can delete any file or object to which the access permission applies. Conversely, a user having the delete access permission set to a value of "false" cannot delete any file or object to which the access permission applies. It is understood that the present disclosure is not limited to "create," "read," "update," and "delete" permissions, and that additional permissions can be applied and managed in the same manner.

The access permissions can be configured to provide a granular level of control. For example, the permission can be subject to one or more limitations. The access permissions can be subject to scope limitations, temporal limitations, or a combination thereof.

For example, the access permissions can be limited to actions taken within a specific object, component, application, program, system, or project. A user responsible for interaction with a software program can be granted permission to create, read, update, and delete granular file-level, object level, and functionality-level aspects of the software program. The user's access permissions may not extend to file-level, object-level, and functionality-levels unrelated to the software program. Another user interacting with the same software program can have more limited access permissions. The latter user's access permissions can apply only to granular file-level, object-level, and functionality-levels. The latter user's access permissions also may not extend to granular file-level, object-level, and functionality-level unrelated to the software program.

As another example, the access permissions can be limited with respect to the software objects to which they apply. The foregoing embodiments described limitations placed on file related to a software program, however the present disclosure is not limited thereto. Access permissions can be limited to one or more specified files, file types, file classifications, software objects, variables, data structures, functions, state or combination thereof.

As another example, the access permissions can be temporally limited. The temporal limitation can be globally applied to the entirety of the user's permissions, such as that when the time period for access has ended the user can lose all access permissions for any purpose. Alternatively, the access permissions can be temporal with respect to the duration for a particular task, e.g., upon expiration the user can no longer perform certain actions. The task duration can be manually controlled, for example, manually started and stopped, or automatically controlled based on certain thresholds, for example, started or stopped based on a predetermined time period, specific hours within particular days, upon completion of certain tasks, or upon completion of a particular phase of a project. The control thresholds can be periodic (e.g., access permissions granted to certain users during a recurring maintenance window) or set on an as-needed basis (e.g., to allow certain users to perform a task).

An administration application can manage authorization for a user of an application. The administration application can provide access to view and modify data. This access can be based on the user's administration group membership and/or additional settings that can be determined by the application administrator role. The administration application can manage who can view or modify information in a flexible and extensible way. The administration application can provide access based on the authorized user's authorization level at a specific point in time. The administration application can leverage the CRUD pattern to determine what access is available by route, component, function, and other means. The CRUD permission can be used to set-up or modify the user experience based on the user's authorization settings at a point in time.

Traditionally, applications are developed and static roles are defined with certain privileges and access levels, etc. By combining the authorization level with CRUD, a user can be assigned an admin role, but the administration application can manipulate the way the application behaves even within the authorization role. Furthermore, the administration application can use runtime access and the ability to fine tune the rights for any user dynamically without having to create new roles, etc. For example, the administration application can grant only read permissions at a particular point in time, where otherwise the assigned role allows for create, update or delete. For example, the administration application can grant only read permissions for particular objects within the application, where otherwise the assigned role allows for create, update or delete. Some advantages of the administration application include the expansion, creation or limiting of traditional role-based access rights, without having to add new roles or updates to a front end application. This allows highly configurable permutations of roles per user and per component as the application evolves over time. The administration application can modify what a user sees in a display for an application based on a condition. For example, when a developer is using an application framework such as Angular, React or Vue, it is helpful to be able to modify displays using a condition and the CRUD pattern.

It is understood that the scope and temporal limitations are not necessarily mutually exclusive. Embodiments of the present disclosure provide that one or more scope limitations and one or more temporal limitations can be used in combination with each other or in an otherwise complementary manner.

Users can be associated into security groups for the purposes of administering access permissions. In an embodiment, all members of a security group can have the same access permissions. Newly added users can receive the same access permissions available to the group, and each security group can have one or more sub-groups that inherit the access permissions of the security group. Membership in a security group or sub-group does not preclude the application and adjustment of access permissions for an individual user, however, the alteration of a particular user's access permissions in a manner inconsistent with the security group or sub-group can result in the removal of the user from the security group or sub-group.

The access permissions can be continuously monitored and each action requested by a user can be reviewed for authorization prior to execution. For example, if at the time a user interface is presented, a user's access permissions permit the user to access a certain tool, that tool can be displayed to the user on the interface. If at a later time, the user requests that the tool perform a certain function, the user's access permissions can be verified again upon receipt of the user's request and prior to the execution of the function, to ensure the user has sufficient authorization for this action. The authorization role of the application can be checked. Other limitations passed at runtime can be checked to determine the layered rights. These runtime authorizations can be easily configured without adjusting the underlying roles.

For example, a team of users can be involved in the development of a software application. During the initial period of development when many users are writing and editing source code, all users on the team can have extensive access permissions. As development progresses and certain tasks are completed, access permissions can be removed from the users responsible for the completed tasks. In addition, as the development process requires new tasks additional users can be granted access permissions or the scope of permissions for existing users can be extended. For example, if the software application requires beta testing, users responsible for beta testing can be granted "read" permissions, or other access permissions necessary for their work without foresaid software application modifications. Once the software application is completed and deployed, access permissions for many users responsible for development can be reduced or revoked. Users responsible for supporting and maintaining the application during operation can receive the required access permissions.

As another example, established software applications can require maintenance be performed on a periodic or as-needed basis. In either case, during a maintenance break, users required to perform the maintenance can receive additional access permissions necessary to perform the maintenance work. Other users, such as end users of the application, can have access permissions restricted (e.g., to "read" only) or removed. By doing so, interference with the maintenance process can be avoided, while end users and others can be given access to more functionality than if the application were entirely unavailable.

Access permissions can also be applied in a manner to facilitate application deployment. For example, applications with multiple elements can be deployed on a rolling basis. In this case, end users can receive access permissions to particular functionalities as each becomes available, while continuing to be restricted from accessing functionalities. This approach can be applied to a "freemium" product model, where users meeting certain criteria (e.g., payment levels) receive access permissions for various functionalities with no software program modifications.

Figure 7:
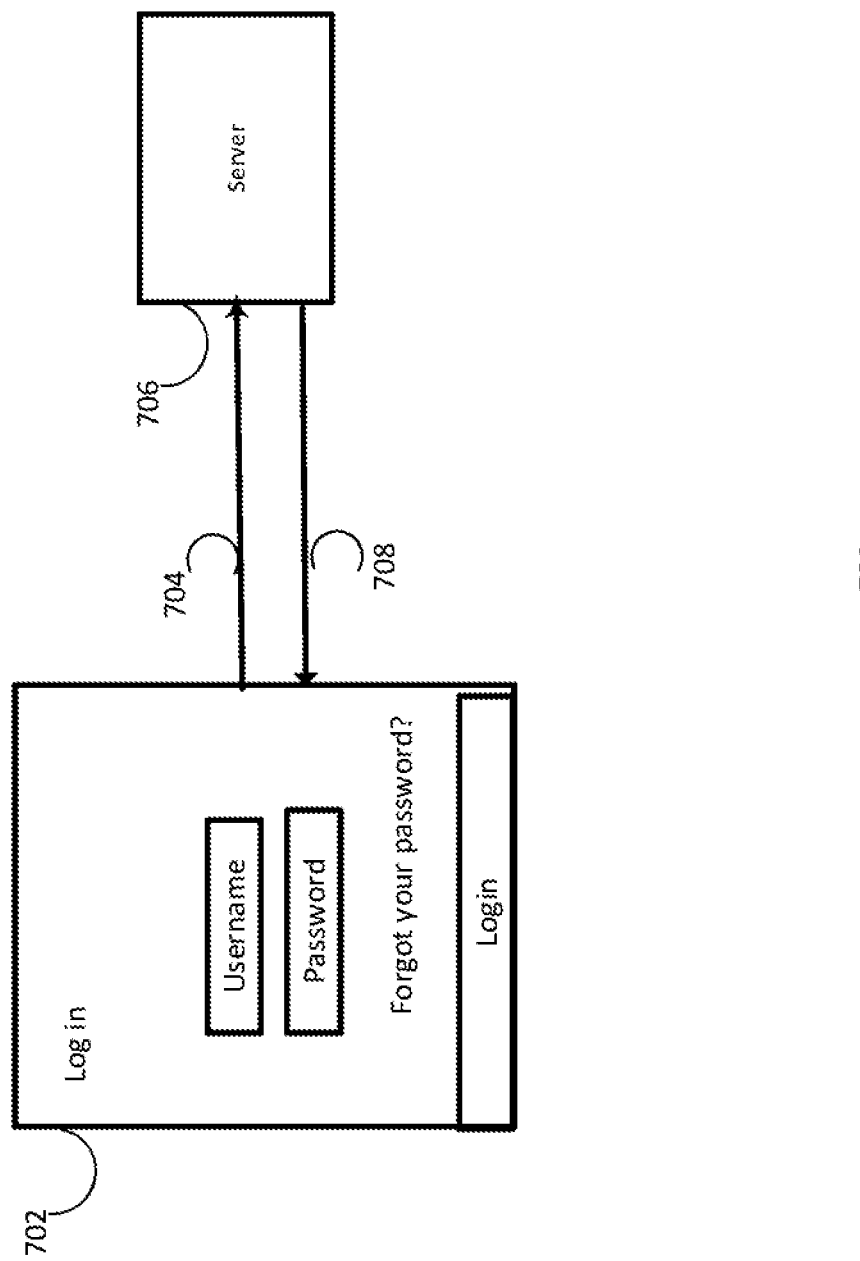
FIG. 7 is a diagram of a system for authentication, according to an example embodiment.

FIG. 7 illustrates a system 700 for authentication, according to an example embodiment. A client application 702 processes a user login by sending a message 704 to a server 706, which sends a response 708, authenticating the user.

Figure 8:
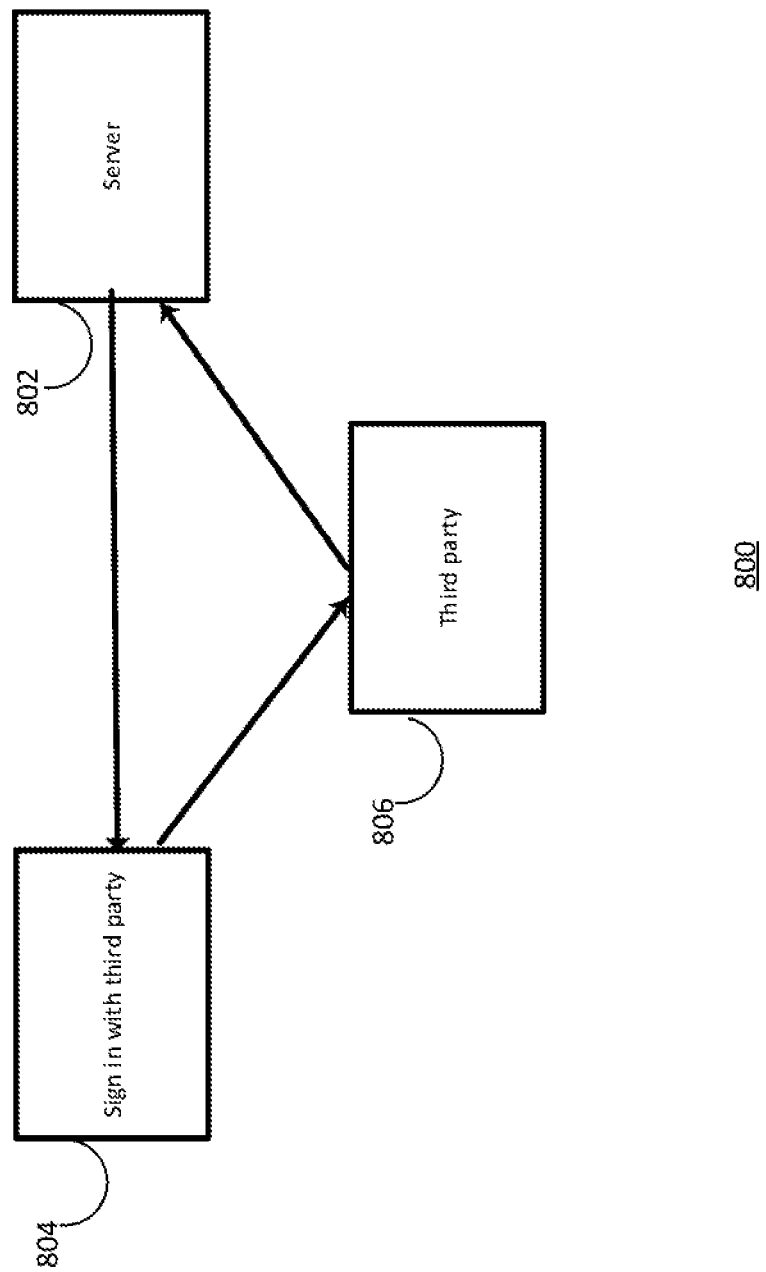
FIG. 8 is a diagram of a system for authentication, according to an example embodiment.

FIG. 8 illustrates a system 800 for authentication, according to an example embodiment. A server 802 can provide an option 804 on a client application to sign in with a third party. The option 804 can be handled by a third party 806, which communicates with the server 802 to authenticate the third party sign in. For example, a shopping application can allow a third party payment processing company to authenticate a purchase. For example, OpenID Connect (OIDC) may be used for authentication.

JSON Web Token (JWT) is an open standard (RFC 7519) that defines a compact and self-contained way for securely transmitting information between parties as a JSON object. A JWT includes three parts, a header, a payload, and a signature. For example, example code for a header

```
{
    "alg": "HS256",
    "typ": "JWT"
}
```

Example code for a payload

```
{
    "sub": "1234567890",
    "name": "John Doe",
    "email": johndoe@email.com,
    "iat": 1516239022,
}
``` and example code for a signature

```
HMACSHA256(header + "." + payload, pa$sw0rd)
can be formatted as [header].[payload].[signature] into
eyJhbGciOiJIUzI1N9.3ODkwIiwibmFtZSI6.u6VTx2CHvo.
```

This payload 3ODkwIiwibmFtZSI6 can be associated with the following example code.

```
{
    "sub": "1234567890",
    "admin": true,
    "name": "John Doe",
    "email": johndoe@email.com,
    "iat": 1516239022,
    "exp": 1516240022,
    "uid": "573hdk",
    "claims": [
        canEditusers,
        canAddProducts,
        canAddLocations
    ]
}
{
    "sub": "1234567890",
    "admin": true,
    "email": johndoe@email.com,
 "iat": 1516239022,
    "exp": 1516240022,
    "uid": "573hdk",
    "roles": [
        Manager,
        superAdmin
    ]
}
```

Figure 9:
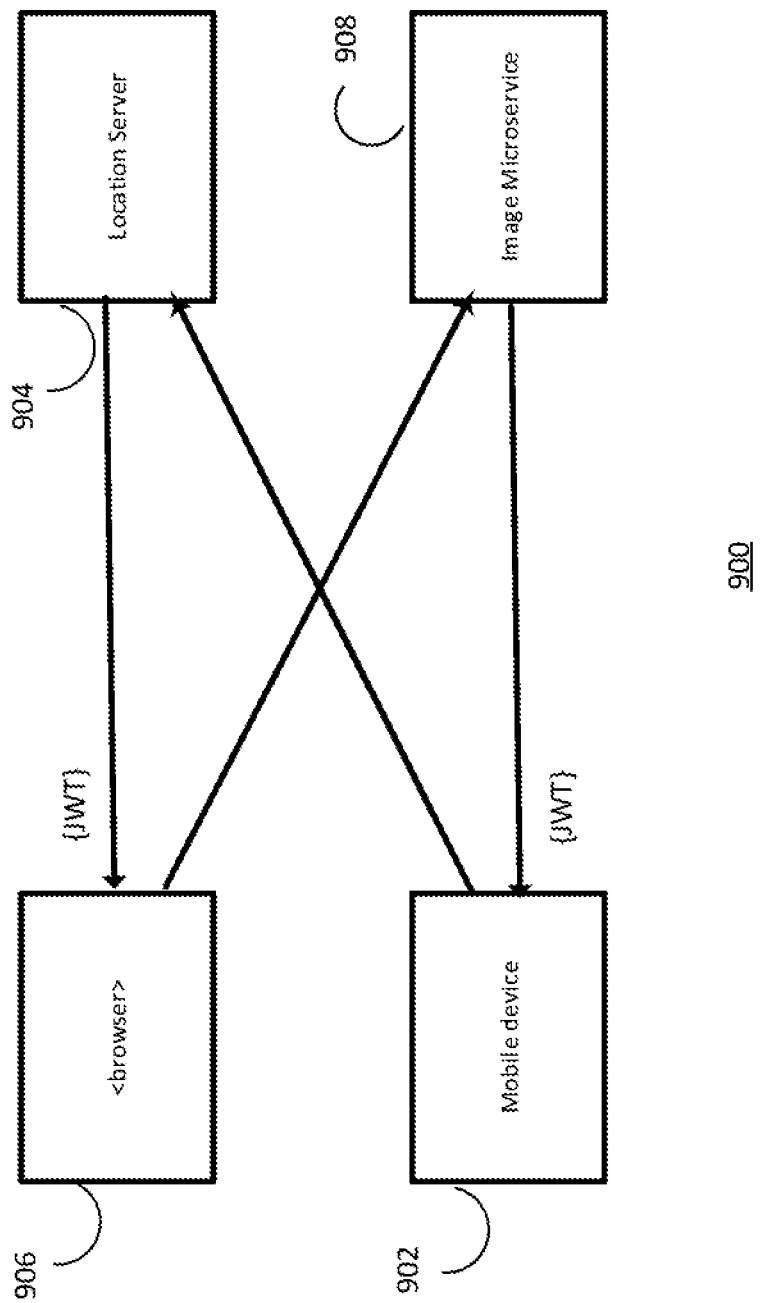
FIG. 9 is a diagram of a system for authentication, according to an example embodiment.

FIG. 9 illustrates a system 900 for authentication, according to an example embodiment. A mobile device 902 provides location information to a location server 904. The location server 904 sends JWT to authenticate a user to a browser 906. The browser 906 sends a request to an image microservice 908 and the microservice 908 sends JWT to authenticate the user to the mobile device 902. The image microservice 908 can provide mobile image processing. For example, the browser 906 can be a payment processing application and the mobile device 902 can authenticate the identity of the user by scanning an optical code displayed on the browser 906 with a camera on the mobile device. Once the user is authenticated, certain authorization rights can be determined and/or modified.

Figure 10:
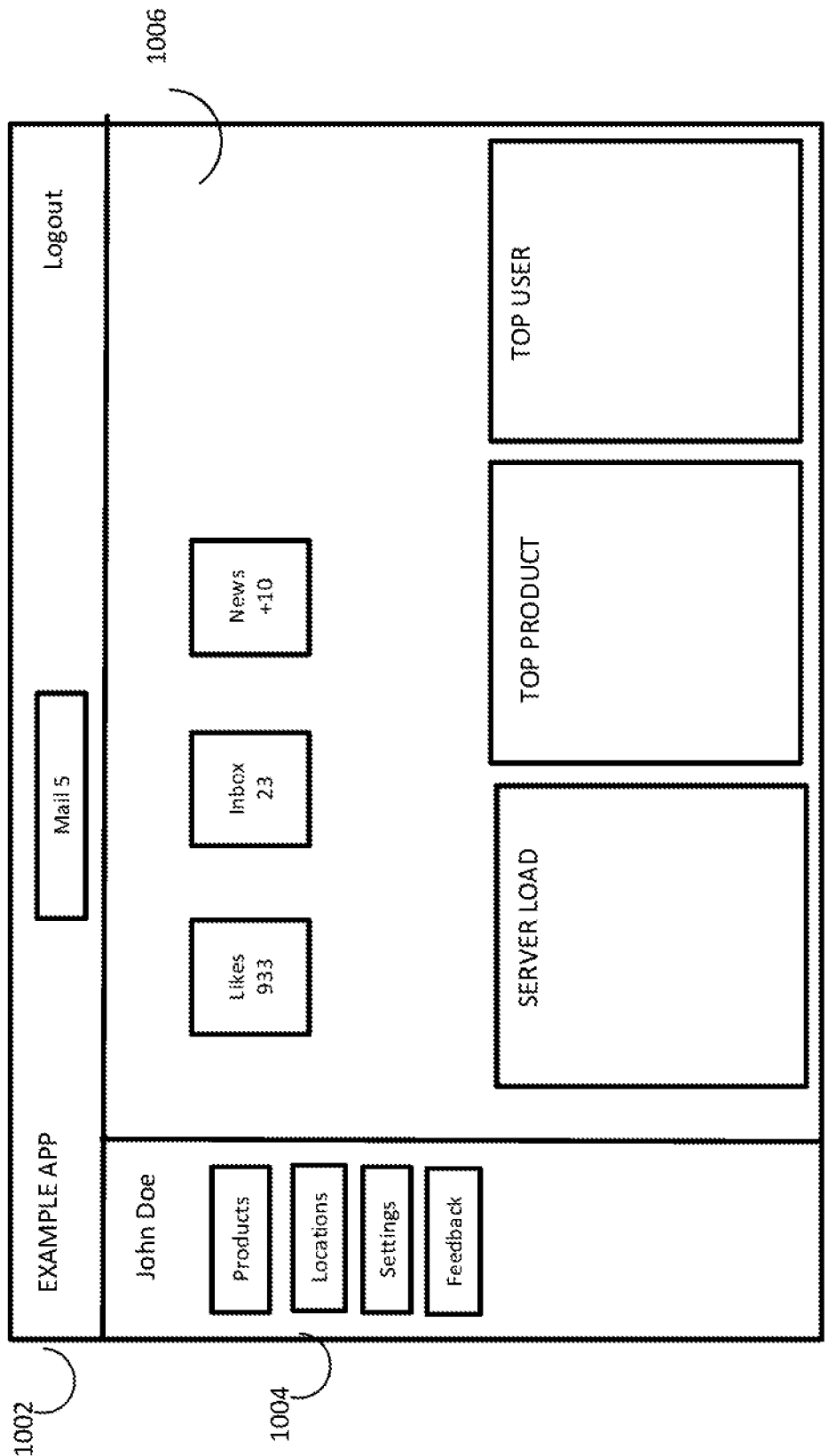
FIG. 10 is a diagram of an application user interface for a user, according to an example embodiment.

FIG. 10 is an application user interface 1000 for a user, according to an example embodiment. Based on dynamic, granular access permissions for a particular user at a particular time, the application user interface 1000 can include several layout views, a header 1002, a left menu 1004, and a center 1006. Over time and as the user interacts with the application user interface 1000, access permissions can be determined and modified in a dynamic and granular way, which can change the application user interface 1000. For example, the options on the left menu 1004 can be modified based on dynamic and granular access permissions.

Figure 11:
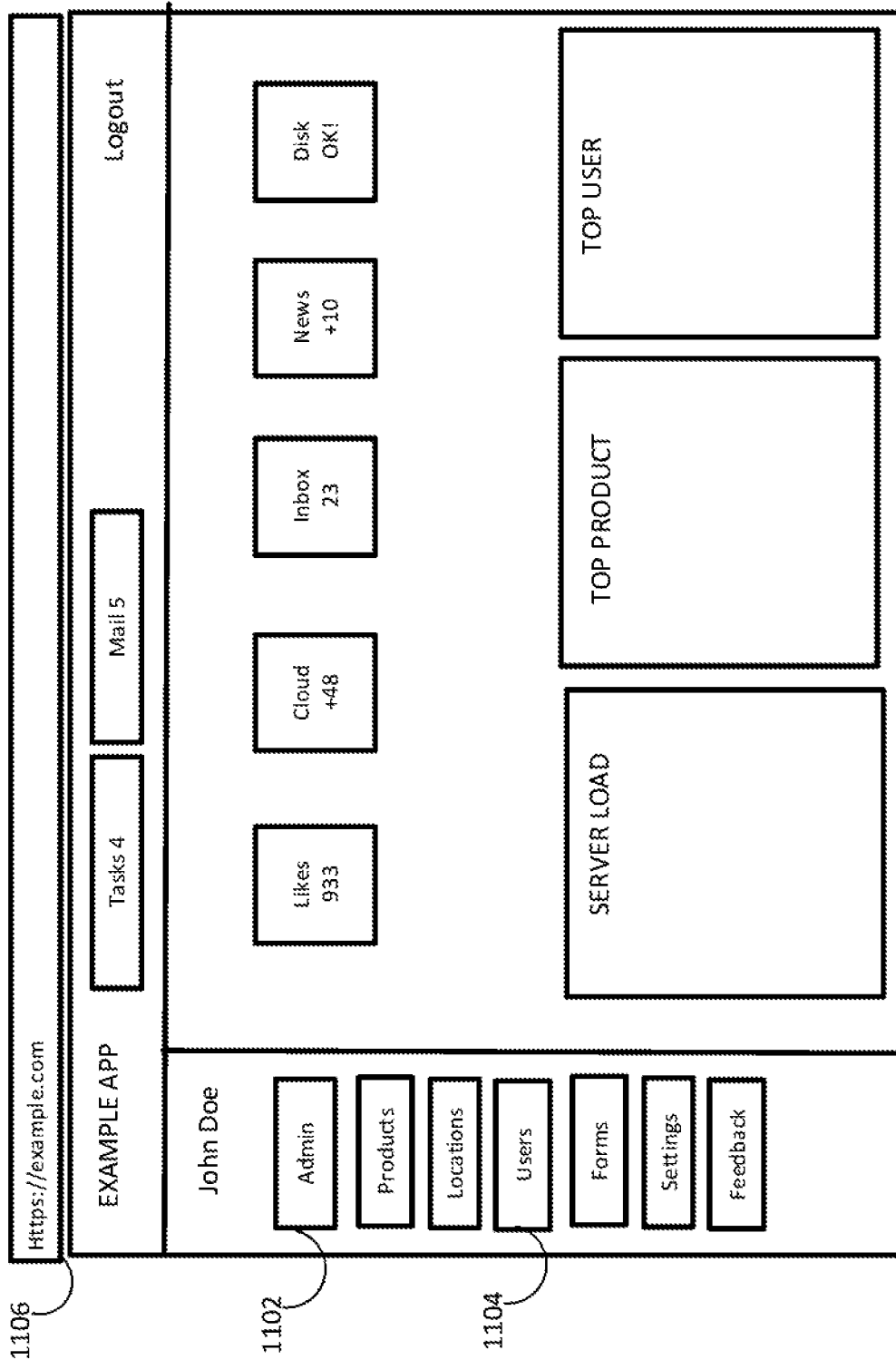
FIG. 11 is a diagram of an application user interface for a user, according to an example embodiment.

FIG. 11 is an application user interface 1100 for a user, according to an example embodiment. Based on dynamic, granular access permissions for a particular user at a particular time, the application user interface 1100 includes an admin button 1102, a users button 1104, and a web address 1106. Comparing FIGS. 10 and 11 illustrates how user interfaces can change for the user over time, as the user interacts with the user interface and access permissions are determined and modified. Example code associated with the admin button 1102 of the application user interface 1100 can be as follows.

```
<ul>
...
    <li *ngIf="role === 'admin' || role === 'auditor' ">
        <a routerLink="/admin"
            routerLinkActive="active">Admin</a>
    </li>
    <li>
        <a routerLink="/products"
            routerLinkActive="active">Products</a>
    </li>
...
</ul>
```

In another example, for the Angular framework the example code associated with the admin button 1102 of the application user interface 1100 can be as follows.

```
<ul>
...
    <li *ngIf="role === 'admin' || role === 'auditor' || role === 'superAdmin' ">
        <a routerLink="/admin"
            routerLinkActive="active">Admin</a>
    </li>
    <li>
        <a routerLink="/products"
            routerLinkActive="active">Products</a>
    </li>
...
</ul>
```

CRUD can be used in code associated with the admin button 1102 on application user interface 1100.

```
{
    Create
    Read
    Update
    Delete
}
```

The following example code can be associated with the users button 1104 on application user interface 1100.

```
<ul>
...
    <li>
        <a routerLink="/products"
            routerlinkActive="active">Products</a>
    </li>
    <li *ngIf="getRouteAuth('users')">
        <a routerLink="users"
            routerLinkActive="active">Users</a>
    </li>
...
</ul>
```

The following example code can be associated with the users button 1104 on application user interface 1100.

```
// API Response
Const routeAuth = [..{
    "name": "users",
    "create": true,
    "read": true,
    "update": true,
    "delete": true
}];
// Authorization Service
Let getrouteAuth = (route: string) => {
    // Find a matching route authorization for provided route
    Const auth = routeAuth.find((obj) => {return obj,.name === route;
    });
    If (auth) {
        return auth.read;
    }
    return false;
}
```

Dynamic, granular control over navigation by a user can be achieved, including detecting when the user inappropriately attempts to navigate to an unauthorized web address. This is better than traditional static and global approaches that may be vulnerable to security problems with routing or navigation for an application. If the user attempts to edit the web address 1106, then the following example code can be associated with checking route access permissions.

```
canActivate( ) : Boolean {
    if (!this.auth.isAuthenticated( )) {
        this.router.navigagte(['login']);
        return false;
    }
    return true;
}
// Route is the information about a specific route
canActivate(route: ActivatedRoute): Boolean {
    if (!this.auth.isAuthenticated( ) ||
        !this.auth.getRouteAuth(route)) {
        this.router.navigate(['login']);
        return false;
    }
    return true;
}
// API Response
Const = routeAuth = [..{
    "name": "admin",
    "create": true,
    "read": true,
    "update": true,
    "delete": true
}];
// Authorization Service
Let getRouteAuth = (route: string) => {
```

```
// Find a matching route authorization for provided route
const auth = routeAuth.find((obj) => {return obj.name === route; });
if (auth){
    return auth.read;
}
return false;
}
```

Figure 12:
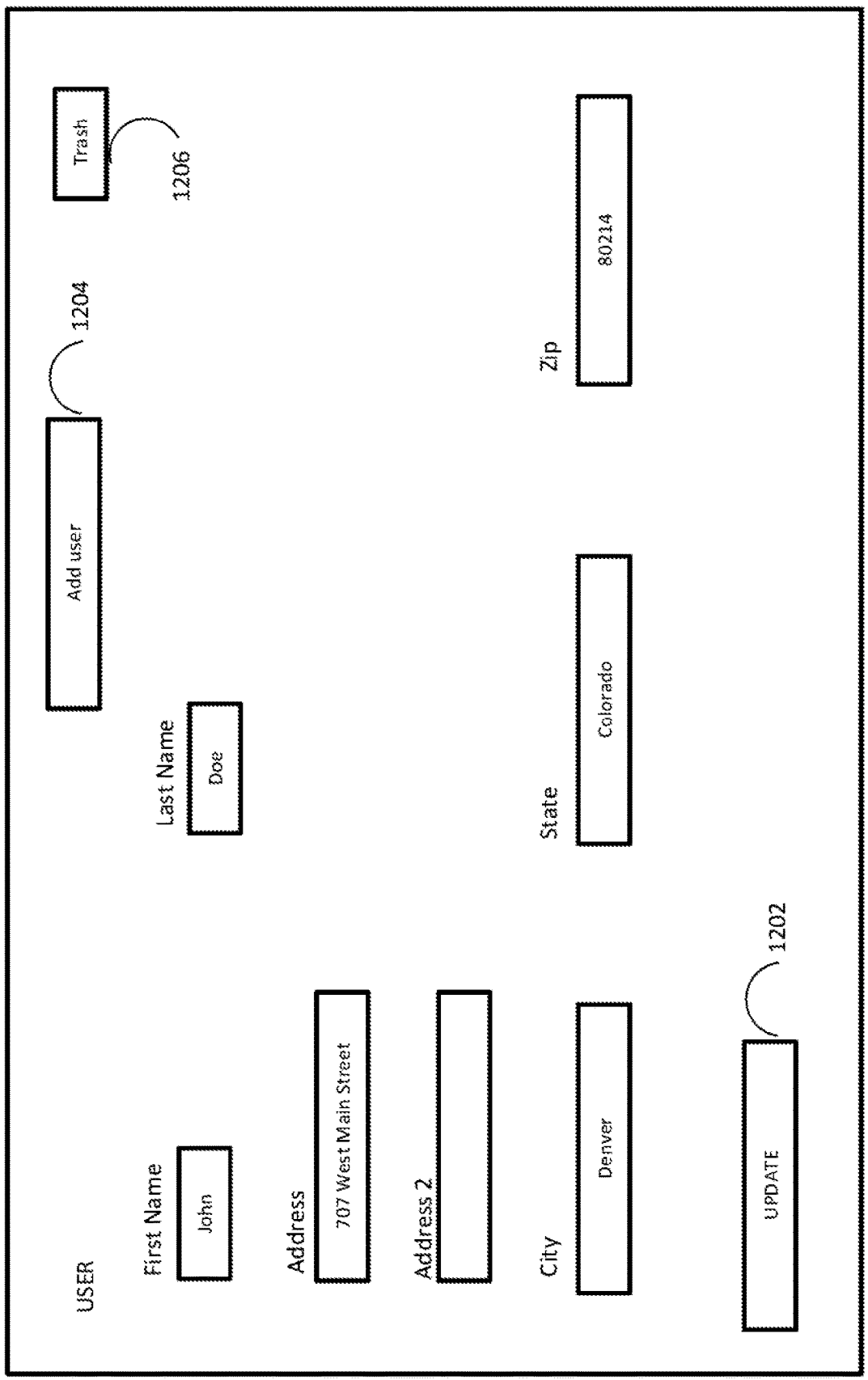
FIG. 12 is a diagram of an application user interface for managing users, according to an example embodiment.

FIG. 12 is an application user interface 1200 for managing users, according to an example embodiment. The application user interface 1200 includes an update button 1202, and add user button 1204 and a trash button 1206 along with fields for entering user information.

The following example code, which is for the Angular framework, can be associated with managing users on application user interface 1200.

```
<!--User Component -->
<form *ngIf="role === 'admin' || role === 'user'">
    <div class="form-row">
        <div class="form-group col-md-6">
            <label for='firstName'>First Name</label>
            <input type="text" id="firstName"
            placeholder="FirstName">
        </div>
        <div class="form-group col-md-6">
            <label for="lastName">Last Name</label>
            <input type="text" id=lastName"
            placeholder="LastName">
        </div>
        <div class="form-group">
            <label for="address">Address</label>
            <input type="text" id="address" placeholder="1234 Main
            St">
        </div>
        <div class="form-group">
            Mabel for="adress2">Address 2</label>
            <input type="text" id=address2
            Placeholder="Apartment, studio, or floor">
        </div>
...
        <button type="submit">Update</button>
</form>
```

The following example code can be associated with the update button 1202 on application user interface 1200.

```
// User Role
{
    "name": "userForm",
    "create": false,
    "read": true,
    "update": true,
    "delete": false
}
```

The following example code can be associated with managing users on application user interface 1200.

```
<!--User Component -->
<form *ngIf="role === 'admin' || role === 'user'">
    <div class="form-row">
        <div class="form-group col-md-6">
            <label for='firstName'>First Name</label>
            <input type="text" id="firstName"
            placeholder="First Name"
            [disabled]="!auth.create || !auth.update" *ngIf="auth.read">
        </div>
        <div class="form-group col-md-6">
            <label for="lastName">Last Name</label>
            <input type="text" id=lastName" placeholder="LastName"
            [disabled]="!auth.create || !auth.update" *ngIf="auth.read">
        </div>
        <div class="form-group">
            <label for="address">Address</label>
            <input type="text" id="address" placeholder="1234 Main
            St"
            [disabled]="!auth.create || !auth.update" *ngIf="auth.read">
        </div>
        <div class="form-group">
            <label for="adress2">Address 2</label>
            <input type="text" id=address2
            Placeholder="Apartment, studio, or floor"
            [disabled]="!auth.create || !auth.update" *ngIf="auth.read">
        </div>
...
        <button type="submit">Update</button>
</form>
```

The following example code can be associated with the add user button 1204 on application user interface 1200.

```
// Admin Role
{
    "name": "userForm",
    "create": true,
    "read": true,
    "update": true,
    "delete": true
}
```

The following example code can be associated with the trash button 1206 on application user interface 1200.

```
// Admin Role
{
    "name": "userForm",
    "create": true,
    "read": true,
    "update": true,
    "delete": true
}
```

The following example code can be associated with the trash button 1206 on application user interface 1200.

```
// Admin Role
{
    "name": "userForm",
    "create": false,
    "read": true,
    "update": false,
    "delete": false
}
...
@Component({
    selector: 'user-form',
    templateUrl: './user-form.component.html'
})
export class UserFormComponent {
...
    getData(authorization: Object){
        if(authorization.read){
            this.http.get('users').subscribe(response => {
                // do something
            });
        }
    }
}
```

The following example code can be associated with the trash button 1206 on application user interface 1200.

```
// Admin Role
{
    "name": "userForm",
    "create": false,
    "read": true,
    "update": false,
    "delete": false
}
...
@Component({
    selector: 'user-form',
    templateUrl: './user-form.component.html'
})
export class UserFormComponent {
...
    getData(authorization: Object){
        if(authorization.update){
            this.http.get('users').subscribe(response => {
                // do something
            });
        }
    }
}
```

The above example code illustrates how fine grained control over the individual objects of a user interface can be achieved. When access control permissions change, the following message can be displayed on application user interface 1200: "We are making updates to improve your experience, some functionality temporarily disabled."

Figure 13:
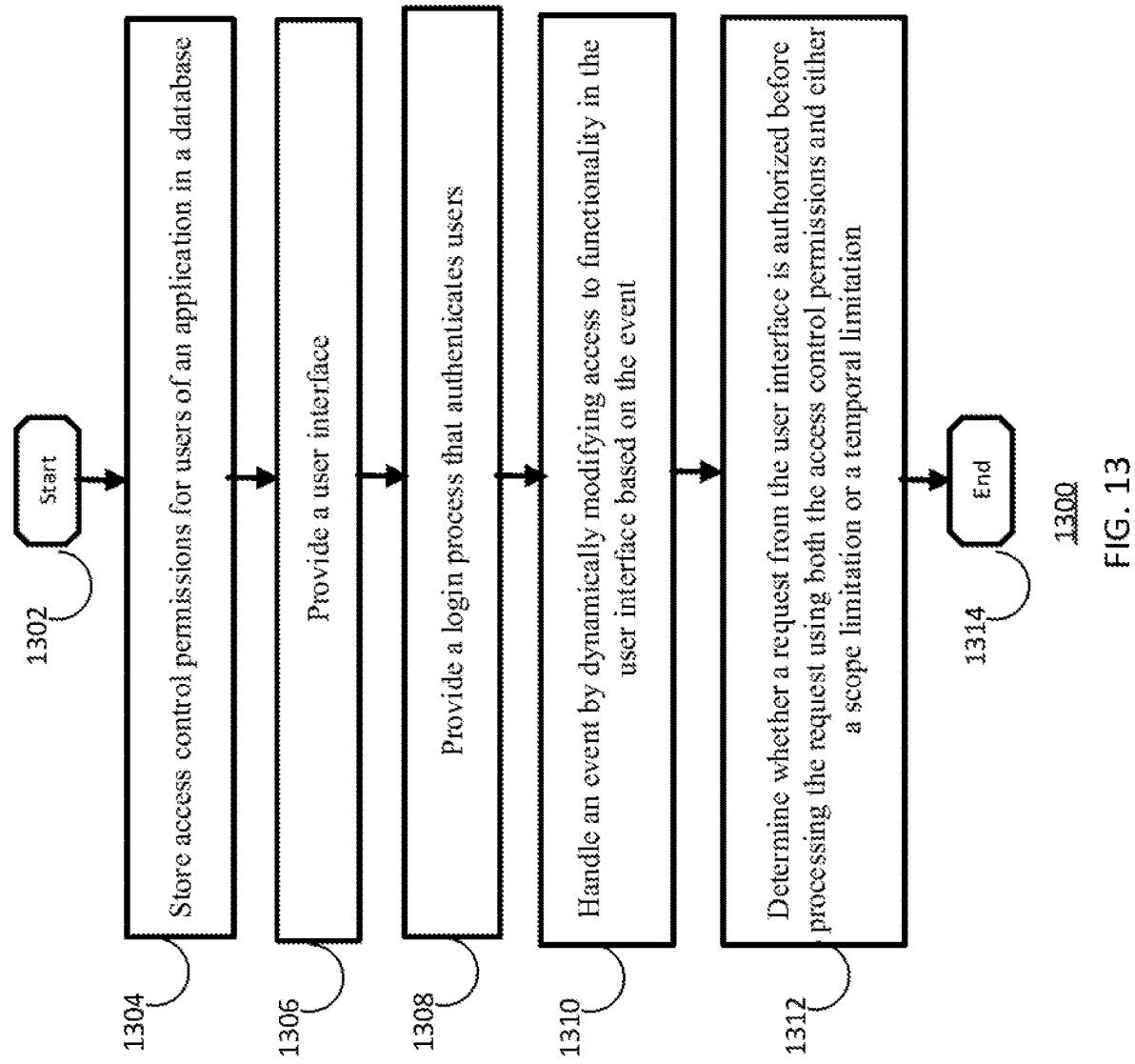
FIG. 13 is a flowchart of a method for user access permissions, according to an example embodiment.

FIG. 13 is a flowchart of a method 1300 for user access permissions, according to an example embodiment. Method 1300 starts at block 1302. At block 1304, access control permissions for users of an application are stored in a database. At block 1306, a user interface is provided. At block 1308, a login process is provided as part of the user interface that authenticates users. At block 1310, an event is handled by dynamically modifying access to functionality in the user interface based on the event. For example, the event can be a change in the user's access permissions, a scope limitation, a time duration limitation or some other condition, rule or logic. For example, the event may be an attempt by the user to navigate to a web page that does not have an authorized route handler in the application. At block 1312, it is determined whether a request from the user interface is authorized before processing the request using both the access control permissions and either a scope limitation or a temporal limitation. For example, the access permissions can be limited to actions taken within a specific object, component, application, program, system, or project. For example, the access permissions can be temporal with respect to the duration for a particular task so that upon expiration the user can no longer perform certain actions. Method 1310 ends at block 1314. In an example embodiment, the method includes determining a default set of access control permissions for the user interface. In an example embodiment, the login process includes limiting the user interface to what is authorized by the default set of access control permissions. In an example embodiment, dynamically modifying access to functionality includes changing the access control permissions in the database. For example, when users are added or deleted from an application, the corresponding access control permissions can be changed in the database. In an example embodiment, the request from the user interface is a routing request. In an example embodiment, the application is a software development platform and the scope limitation or the temporal limitation is related to software development. In an example embodiment, the user interface includes a user management process that provides tools for adding, updating, and deleting users. In an example embodiment, the user management process changes access control permissions in the database.

Figure 14:
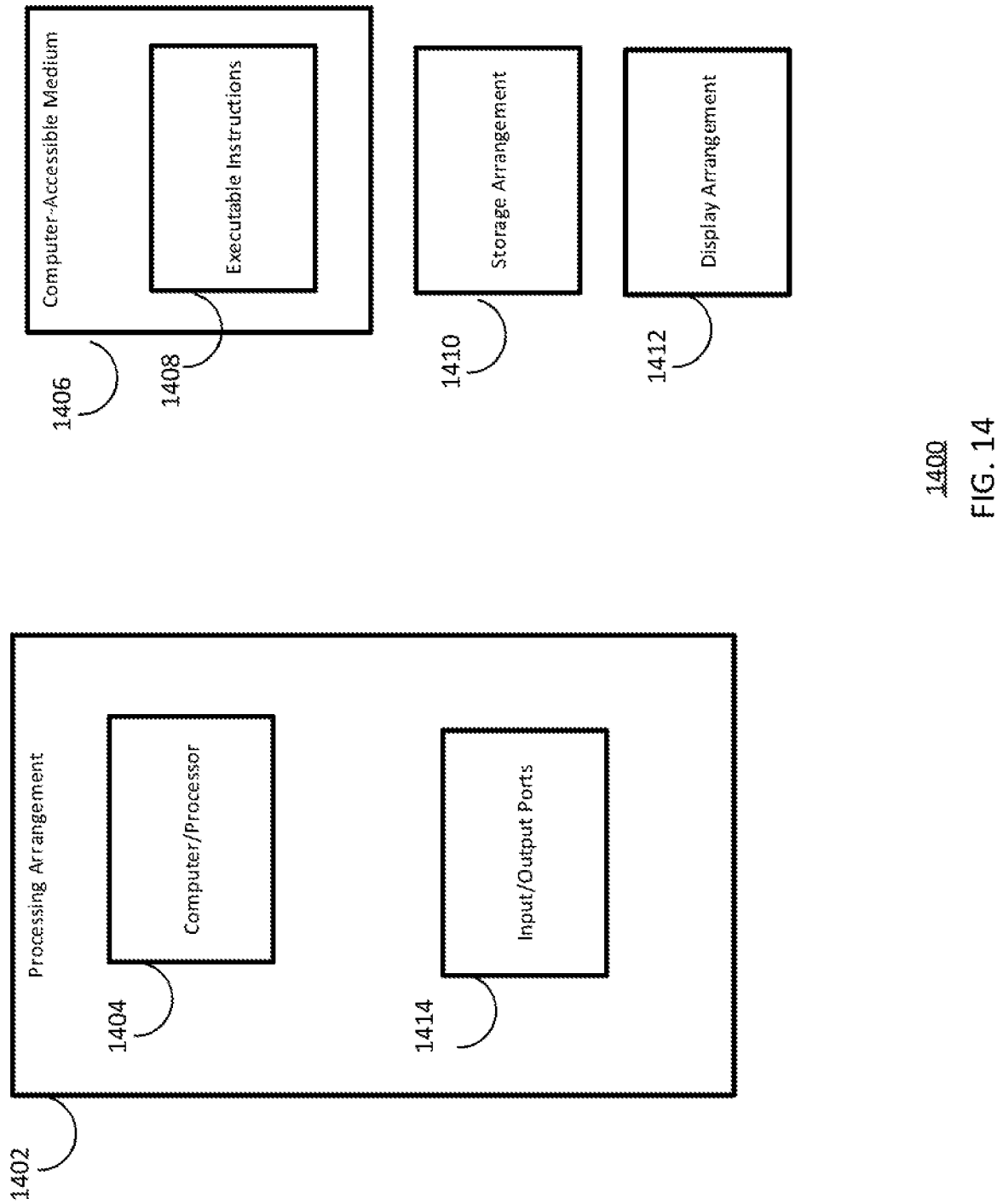
FIG. 14 is a diagram of a system, according to an example embodiment.

FIG. 14 shows a block diagram of an exemplary embodiment of a system 1400 according to the present disclosure. For example, exemplary procedures in accordance with the present disclosure described herein can be performed by a processing arrangement and/or a computing arrangement (e.g., computer hardware arrangement) 1402. Such processing/computing arrangement 1402 can be, for example entirely or a part of, or include, but not limited to, a computer/processor 1404 that can include, for example one or more microprocessors, and use instructions stored on a computer-accessible medium (e.g., RAM, ROM, hard drive, or other storage device).

As shown in FIG. 14, for example a computer-accessible medium 1406 (e.g., as described herein above, a storage device such as a hard disk, floppy disk, memory stick, CD-ROM, RAM, ROM, etc., or a collection thereof) can be provided (e.g., in communication with the processing arrangement 1402). The computer-accessible medium 1406 can contain executable instructions 1408 thereon. In addition or alternatively, a storage arrangement 1410 can be provided separately from the computer-accessible medium 1406, which can provide the instructions to the processing arrangement 1402 so as to configure the processing arrangement to execute certain exemplary procedures, processes, and methods, as FIG. 14 shows a block diagram of an exemplary embodiment of a system according to the present disclosure. For example, exemplary procedures in accordance with the present disclosure described herein can be performed by a processing arrangement and/or a computing arrangement (e.g., computer hardware arrangement) 1404. Such processing/computing arrangement 1404 can be, for example entirely or a part of, or include, but not limited to, a computer/processor 1404 that can include, for example one or more microprocessors, and use instructions stored on a computer-accessible medium (e.g., RAM, ROM, hard drive, or other storage device).

As shown in FIG. 14, for example a computer-accessible medium 1406 (e.g., as described herein above, a storage device such as a hard disk, floppy disk, memory stick, CD-ROM, RAM, ROM, etc., or a collection thereof) can be provided (e.g., in communication with the processing arrangement 1402). The computer-accessible medium 1406 can contain executable instructions 1408 thereon. In addition or alternatively, a storage arrangement 1410 can be provided separately from the computer-accessible medium 1406, which can provide the instructions to the processing arrangement 1402 so as to configure the processing arrangement to execute certain exemplary procedures, processes, and methods, as described herein above, for example.

Further, the exemplary processing arrangement 1402 can be provided with or include an input/output ports 1414, which can include, for example a wired network, a wireless network, the internet, an intranet, a data collection probe, a sensor, etc. As shown in FIG. 14, the exemplary processing arrangement 1402 can be in communication with an exemplary display arrangement 1412, which, according to certain exemplary embodiments of the present disclosure, can be a touch-screen configured for inputting information to the processing arrangement in addition to outputting information from the processing arrangement, for example. Further, the exemplary display arrangement 1412 and/or a storage arrangement 1410 can be used to display and/or store data in a user-accessible format and/or user-readable format described herein above, for example.

Further, the exemplary processing arrangement 1402 can be provided with or include an input/output ports 1414, which can include, for example a wired network, a wireless network, the internet, an intranet, a data collection probe, a sensor, etc. As shown in FIG. 14, the exemplary processing arrangement 1402 can be in communication with an exemplary display arrangement 1412, which, according to certain exemplary embodiments of the present disclosure, can be a touch-screen configured for inputting information to the processing arrangement in addition to outputting information from the processing arrangement, for example. Further, the exemplary display arrangement 1412 and/or a storage arrangement 1410 can be used to display and/or store data in a user-accessible format and/or user-readable format.

As described herein, implementing and managing dynamic, granular access permissions according to embodiments of the present disclosure have a number of benefits. These include improved data security, improved privacy controls, and managed environment for application development, maintenance, and deployment.

In this description, numerous specific details have been set forth. It is to be understood, however, that implementations of the disclosed technology can be practiced without these specific details. In other instances, well-known methods, structures and techniques have not been shown in detail in order not to obscure an understanding of this description. References to "some examples," "other examples," "one example," "an example," "various examples," "one embodiment," "an embodiment," "some embodiments," "example embodiment," "various embodiments," "one implementation," "an implementation," "example implementation," "various implementations," "some implementations," etc., indicate that the implementation(s) of the disclosed technology so described can include a particular feature, structure, or characteristic, but not every implementation necessarily includes the particular feature, structure, or characteristic. Further, repeated use of the phrases "in one example," "in one embodiment," or "in one implementation" does not necessarily refer to the same example, embodiment, or implementation, although it can.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and can include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system, comprising:
    a server for providing an application to users;
    an access permission database accessible by the server for storing permanent access permissions for the users, wherein the permanent access permissions are role-based authorizations and the users are assigned to roles that align with their roles in an organization's hierarchy or the application, and that determine a level of access the users have within the application;
    a memory that stores temporary access permissions for a first user while the application is executing, the memory being accessible by the server;
    wherein the application is configured to:
        retrieve the permanent access permissions for the first user from the access permission database;
        provide a user interface for the users;
        determine a set of default access permissions for the first user based on the permanent access permissions, after an authentication of the first user, wherein the set of default access permissions are role-based authorizations;
        store the set of default access permissions as the temporary access permissions in the memory;
        provide an event handler that dynamically modifies at least one temporary access permission for the first user by applying to the first user at least one selected from a group of a scope limited access permission and a temporally limited access permission, wherein the selected access permission is a claims-based authorization; and
        provide an authorization process that determines whether a request from the user interface is authorized before processing the request using the permanent access permissions from an administrator, the temporary access permission, and the at least one selected from the group of the scope limited access permission and the temporally limited access permission,
    wherein the claims-based authorization provides a level of authority that is tied to the users taking actions and not tied to the users specific role within the organization's hierarchy or application.

2. The system of claim 1, wherein the scope limited access permission limits actions associated with at least one of (i) an object, (ii) a component, (iii) an application, (iv) a program, (v) a system, or (vi) a project.

3. The system of claim 1, wherein the temporally limited access permission limits at least one action for the first user before, during, or after a time period.

4. The system of claim 1, wherein the permanent access permissions include one or more security groups of users, the users in each security group having a same set of the access permissions.

5. The system of claim 4, wherein at least one security group of the security groups includes one or more subgroups that inherit the access permissions of the at least one security group.

6. The system of claim 4, wherein the application is further configured to dynamically modify at least one of the temporary access permissions of a user of a respective security group.

7. The system of claim 6, wherein the application is further configured to remove the user from the security group when the dynamic modification of the temporary access permissions is inconsistent with the security group.

8. The system of claim 1, wherein the application is further configured to determine the temporary access permission for an action requested by the first user before executing the action.

9. The system of claim 1, wherein the application is further configured to provide the user interface including only actions that are permitted for the first user.

10. The system of claim 9, wherein at least one of the actions is modified on the user interface due to a temporal limitation.

11. A method, comprising:
   storing permanent access control permissions for users of an application in a database, wherein the permanent access control permissions are role-based authorizations and the users are assigned to roles that align with their roles in an organization's hierarchy or the application, and that determine a level of access the users have within the application;
   providing a user interface for the application that authenticates users;
   determining a set of default access permissions for users based on the permanent access control permissions, after an authentication of a first user, wherein the set of default access permissions are role-based authorizations;
   providing an event handler that dynamically modifies at least one temporary access permission for the first user by applying to the first user at least one selected from the group of a scope limited access control permission and a temporally limited access control permission, wherein the selected access control permission is a claims-based authorization;
   determining whether a request from the user interface is authorized based on an access control permission and at least one selected from a group of a scope limited access permission and a temporally limited access permission, wherein the selected access permission is a claims-based authorization; and
   providing an authorization process that determines whether the request from the user interface is authorized before processing the request using the permanent access control permissions from an administrator, the temporary access control permissions, and at least one selected from the group of the scope limited access permission and the temporally limited access permission,
   wherein the claims-based authorization provides a level of authority that is tied to the users taking actions and not tied to the users specific roles within the organization's hierarchy or application.

12. The method of claim 11, further comprising determining a default set of access control permissions for the user interface.

13. The method of claim 12, further comprising limiting the user interface to the default set of access control permissions.

14. The method of claim 11, wherein the dynamically modifying at least one temporary access permission includes changing the access control permissions in the database.

15. The method of claim 11, wherein the request from the user interface is a routing request.

16. The method of claim 11, wherein the application is a software development platform and the at least one of the scope limited access control permission or the temporal limited access control permission is related to software development.

17. The method of claim 11, wherein the user management process changes access control permissions in the database.

18. A non-transitory computer-accessible medium having stored thereon computer-executable instructions for dynamic and granular user access permissions, wherein upon execution by a computer arrangement comprising a processor, the instructions cause the computer arrangement to perform procedures comprising:
   providing a database interface to an access control permissions database that stores at least one of roles, actions, or policies for users;
   providing a user interface for the users;
   providing a login process that authenticates the users and determines a default set of access control permissions for the users for the user interface, wherein the default access control permissions are role-based authorizations;
   providing an administrator that provides permanent access control permissions for the users using the database interface, wherein the permanent access control permissions are role-based authorizations and the users are assigned to roles that align with their roles in an organization's hierarchy or an application, and that determine a level of access the users have;
   providing an event handler that dynamically modifies access to functionality in the user interface based on an event creating temporary access control permissions, wherein the temporary access control permissions are claim-based authorizations; and
   providing an authorization process that determines whether a request from the user interface is authorized before processing the request using the permanent access control permissions from the administrator, the temporary access control permissions, and at least one selected from a group of a scope limited access permission and a temporally limited access permission,
   wherein the claims-based authorizations provide a level of authority that is tied to the users taking actions and not tied to the users specific roles within the organization's hierarchy or application.

* * * * *